(No Model.)
G. BROUSSEAU.
DEVICE FOR BLOWING BUBBLES.
No. 513,479. Patented Jan. 30, 1894.
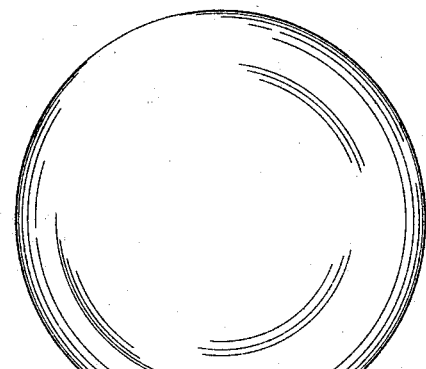
Fig. 1.
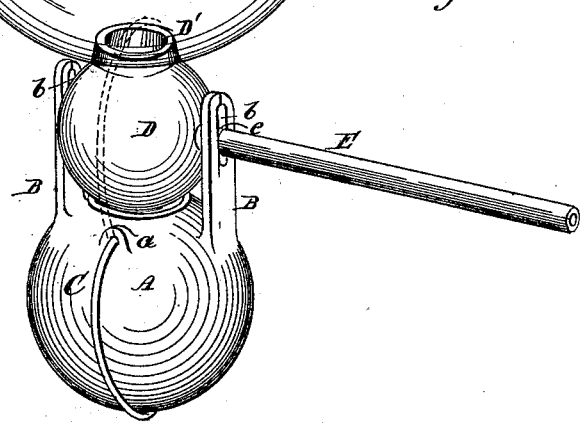
Fig. 2.
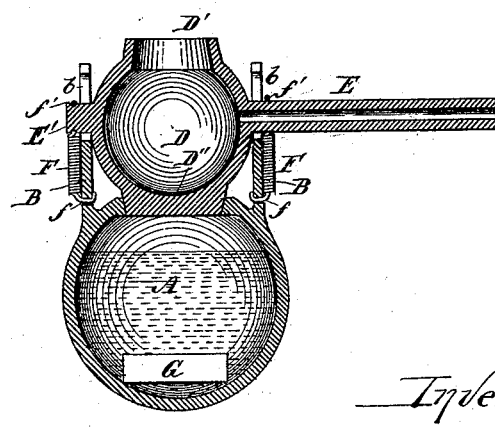
Attest.
L. M. Martinez
C. M. Williams
Inventor
George Brousseau,
By J. M. St. John,
Atty.

UNITED STATES PATENT OFFICE.

GEORGE BROUSSEAU, OF MARION, IOWA.

DEVICE FOR BLOWING BUBBLES.

SPECIFICATION forming part of Letters Patent No. 513,479, dated January 30, 1894.

Application filed July 6, 1893. Serial No. 479,734. (No model.)

*To all whom it may concern:*

Be it known that I, GEORGE BROUSSEAU, a citizen of the United States, residing at Marion, in the county of Linn and State of Iowa, have invented certain new and useful Improvements in Devices for Blowing Bubbles; and I do hereby declare the following to be a full, clear, and exact description of the invention, such as will enable others skilled in the art to which it appertains to make and use the same.

The object of this invention is to produce a convenient device capable of being carried in the pocket, for the blowing of soap bubbles.

The invention consists in the construction, combination and arrangement of parts, as hereinafter fully set forth and claimed.

In the accompanying drawings, forming a part of this specification, Figure 1 is a view in perspective of a device embodying my invention as in use, and Fig. 2 is a central, longitudinal section of the same.

Similar letters of reference indicate corresponding parts.

Referring to the drawings, A is a small vessel, of any suitable shape, but preferably nearly spherical, with an opening at the top. Each side of this opening are upwardly extending lugs B B, with slots $b$ $b$ near the upper ends, to serve as bearings for the pivots E E' of a pipe, D. The pivot E, as will be seen, is the stem of the pipe. The bearings may be close to the pipe-bowl, as shown in Fig. 2, thus preventing lateral motion of the bowl, or the pivots may be provided with grooves $e$, as in Fig. 1, for the same purpose. The bearings should of course have a suitable opening for the introduction of the pivots, that shown being simply a slit in the top, which is spread for the admission of the pivots, and then closed to retain the same. The pipe-bowl has a mouth D' on one side, of suitable shape to take the film, and also such as to close the hole in the vessel A when placed in connection therewith. Opposite the mouth is a head D'', of similar form externally, so as to close the vessel A when the pipe is in position for blowing the bubble. A simple and easily made form for this purpose is that illustrated, being in the nature of a conical plug or stopper, entering the hole in the vessel a slight distance. The slots in the bearing-lugs B B allow for the raising of the pipe-bowl sufficient to permit it to swing half over as required in use.

To prevent the stopper from slipping out of the vessel while carried in the pocket, or otherwise, means are provided for holding the parts securely in connection. This may be simply a bail or loop C, passing over the top of the pipe, as indicated in Fig. 1. Obviously an ordinary rubber-band would serve the purpose, but I prefer a wire bail hinged in suitable ears $a$, thus permanently connecting all the parts of the device. A construction which secures this and also an additional end is shown in Fig. 2. Herein the pivots of the pipe are connected with the vessel by small coil-springs F F, the lower ends $f f$ hooking through holes on the bearing-lugs, and loops $f'$ $f'$ at the upper ends encircling the pivots. This construction, as will be seen, serves to hold either end of the pipe-bowl in connection with the vessel, whether the device be in use for blowing bubbles or not. It therefore admits of the operator throwing off a blown bubble from the pipe with one hand, while the device shown in Fig. 1 would require both hands in this operation to prevent the contents of the vessel from being spilled. That is to say, if one hand holds the stem, the other would need to hold the vessel, though the operator might grasp both the vessel and the pipe-bowl with the same hand. This is less convenient, however, than to toss the bubble off while holding the pipe-stem, and could not be managed so gracefully.

The operation of the device has been indicated, and will be readily understood. The vessel A being supplied with a small cake of strong soap, G, and a suitable quantity of water, the pipe is placed in position to close the vessel, and the contents well shaken to produce a strong suds. The operator then turns the mouth of the pipe-bowl down to the mouth of the vessel, and with a slight shake catches a film thereon. He then turns it over, to the position shown, closing the vessel while the bubble is blown and tossed off.

The device is of such a nature that it may be used by children or adults in this beautiful and fascinating pastime without the inconvenience or any of the unpleasant features of the sport as usually conducted.

The gist of this invention is the combination in a single device of a bubble-blowing pipe and a vessel to contain suds, so connected as to be capable of carriage in the pocket, and I am not aware of any other device embodying this idea.

The device should be made of a material not easily broken, such as block-tin, pewter, or the like.

It is desirable that the stopper should be pressed quite tightly into the mouth of the vessel, particularly when carried about, but it is not necessary that the mouth of the pipe-bowl should do so. On the contrary it is desirable that the latter should lift easily and freely clear of the vessel, so as not to accidentally impair the film thereon. For these reasons it is preferable that the pivot of the pipe should be eccentric to the bowl, nearer the mouth, as shown.

Having thus described my invention, I claim—

1. In a device for blowing bubbles, the combination of a vessel to contain soap suds, having a mouth large enough to receive the mouth of the pipe-bowl, whereby the said pipe-bowl may be inserted to receive the film, a pipe-bowl suitably formed to enter the mouth of the vessel to take the film, and to close the same when not in use, a stem connecting with said bowl, and means substantially as described for connecting the pipe and vessel.

2. In a device for blowing bubbles, the combination of a vessel for holding suds, provided with suitable bearings for a connected pipe, pivoted to said bearings and a pipe having a bowl adapted to close the mouth of said vessel whether turned inwardly to take the film, or outwardly for blowing the bubble.

3. In a device for blowing bubbles, the combination of a vessel for holding suds, and provided with slotted bearings for the pivot of a pipe, and a pipe pivoted in said bearings, and having a mouth and a head or stopper formed on the bowl suitable to hermetically close the mouth of said vessel, substantially as and for the purpose set forth.

4. In a device for blowing bubbles, the combination of a vessel for holding suds, provided with slotted bearings for the pivot of a connected pipe, a pipe pivoted and having a limited movement in said bearings, the bowl of said pipe being adapted to close the mouth of said vessel, and means substantially as described for holding the vessel and pipe-bowl into engagement.

5. In a device for blowing bubbles, the combination of a vessel for holding suds, provided with slotted bearings for the pivot of a pipe, a pipe pivoted by its stem and a short extension opposite thereto, in said bearings, the bowl of the pipe having a mouth adapted to enter the mouth of the vessel, and having a stopper formed thereon to close said vessel, and springs connecting the vessel and the pipe, adapted to draw the parts into close contact during the operation of blowing and tossing off the bubble, as described.

6. In a device for blowing bubbles, the combination of a vessel for holding suds, having bearings for the pivot of a pipe, a pipe-bowl having its mouth formed to enter the mouth of said vessel to take a film, and with a stopper formed thereon to close said mouth, and having pivots set eccentrically to said bowl, whereby the stopper is brought relatively nearer the vessel than the mouth of the pipe-bowl, as specified.

In testimony whereof I affix my signature in presence of two witnesses.

GEORGE BROUSSEAU.

Witnesses:
G. W. SMITH,
SAMUEL DANIELS.